United States Patent
Chen

(10) Patent No.: US 9,366,077 B2
(45) Date of Patent: Jun. 14, 2016

(54) BLIND BODY POSITIONING MECHANISM FOR NON PULL CORD WINDOW BLIND AND WINDOW BLIND USING SAME

(71) Applicant: Chin-Fu Chen, Taichung (TW)

(72) Inventor: Po-Yu Chen, Taichung (TW)

(73) Assignee: Chin-Fu Chen, Taichung (TW)

( * ) Notice: Subject to any disclaimer, the term of this patent is extended or adjusted under 35 U.S.C. 154(b) by 43 days.

(21) Appl. No.: 14/533,539

(22) Filed: Nov. 5, 2014

(65) Prior Publication Data

US 2016/0123447 A1    May 5, 2016

(51) Int. Cl.
*E06B 9/322* (2006.01)
*E06B 9/323* (2006.01)
*F16H 31/00* (2006.01)
*E06B 9/30* (2006.01)

(52) U.S. Cl.
CPC . *E06B 9/323* (2013.01); *E06B 9/30* (2013.01); *F16H 31/001* (2013.01); *E06B 2009/3222* (2013.01)

(58) Field of Classification Search
CPC ... E06B 2009/3222; E06B 9/323; E06B 9/30; E06B 9/322; E06B 2009/2627; E06B 9/324; E06B 9/325; F16H 31/001
See application file for complete search history.

(56) References Cited

U.S. PATENT DOCUMENTS

| | | | | |
|---|---|---|---|---|
| 1,516,681 A * | 11/1924 | Palmer | ............. | F04D 15/0077 188/82.7 |
| 6,149,094 A * | 11/2000 | Martin | ............. | E06B 9/322 160/168.1 P |
| 6,234,236 B1 * | 5/2001 | Kuhar | ............. | E06B 9/32 160/170 |
| 6,644,375 B2 * | 11/2003 | Palmer | ............. | E06B 9/90 160/170 |
| 6,675,861 B2 * | 1/2004 | Palmer | ............. | E06B 9/322 160/170 |
| 7,025,107 B2 * | 4/2006 | Ciuca | ............. | E06B 9/322 160/170 |
| 7,228,797 B1 * | 6/2007 | Hillman | ............. | E06B 9/322 100/170 |
| 7,331,370 B1 * | 2/2008 | Militello | ............. | E06B 9/322 160/170 |

* cited by examiner

*Primary Examiner* — Blair M Johnson
*Assistant Examiner* — Abe Massad
(74) *Attorney, Agent, or Firm* — Muncy, Geissler, Olds & Lowe PC

(57) ABSTRACT

A window body positioning mechanism of a non pull cord window blind includes two first transmission wheels, two transmission cords respectively connected with one ends thereof to the first transmission wheels, two second transmission wheels meshed together and respectively meshed with the first transmission wheels, a coil spring connecting the two second transmission wheels and selectively wound round one second transmission wheel, and two resistance units each including a one-way pawl and a resistance wheel wound by one respective transmission cord and meshed with the one-way pawl. Thus, when extending out or receiving the blind body, the friction resistance between the resistance wheels and the transmission cords and the engagement relationship between the resistance wheels and the respective one-way pawls help achieve excellent blind body positioning effects.

8 Claims, 6 Drawing Sheets

BLIND BODY POSITIONING MECHANISM FOR NON PULL CORD WINDOW BLIND AND WINDOW BLIND USING SAME

BACKGROUND OF THE INVENTION

1. Field of the Invention

The present invention relates to window blind technology, and more particularly to a blind body positioning mechanism for non pull cord window blind and a non pull cord window using the blind body positioning mechanism.

2. Description of the Related Art

Commercial window blinds can be classified into pull-cord window blinds and non pull cord window blinds. A pull-cord window blind uses a pull cord for pulling to move the blind between an extended status and a received status. A non pull cord window blind allows a user to pull down or lift the bottom rail, causing the blind to be moved between an extended status and a received status.

However, although a non pull cord blind allows users to easily extend out or receive the blind body, the blind body is prone to rebounding after fully extended out, or sagging after fully received due to lack of good positioning design in the structural configuration, bringing trouble to the user in actual operation.

SUMMARY OF THE INVENTION

The present invention has been accomplished under the circumstances in view. It is the main object of the present invention to provide a blind body positioning mechanism for non pull cord window blind, which has a simple structure and provides excellent positioning effects, enhancing operating convenience.

To achieve this and other objects of the present invention, a blind body positioning mechanism comprises a casing, two resistance units, two first transmission wheels, two transmission cords, two second transmission wheels, and a coil spring. Each resistance unit comprises a one-way pawl and a resistance wheel. The one-way pawl is pivotally mounted in the casing. The resistance wheel comprises a resistance wheel axle and a one-way sprocket. The resistance wheel axle is rotatably mounted in the casing and wound by one respective transmission cord. The one-way sprocket is fixedly connected to one end of the resistance wheel axle and meshed with the one-way pawl. The two first transmission wheels are rotatably mounted in the casing and spaced from each other. The two transmission cords respectively connected with one ends thereof to the first transmission wheels. The two second transmission wheels are rotatably mounted in the casing between the two first transmission wheels. Further, the two second transmission wheels are meshed together, and respectively meshed with the first transmission wheels. The coil spring connects the two second transmission wheels, and alternatively wound round one of the two second transmission wheels during rotation of the two second transmission wheels.

Thus, when extending out or receiving the blind body, the friction resistance between the resistance wheels and the transmission cords and the engagement relationship between the resistance wheels and the respective one-way pawls help achieve excellent blind body positioning effects.

Preferably, each resistance unit further comprises a resistance shrapnel. The resistance shrapnel is mounted in the casing, comprising an elastic arm and a friction portion located at the elastic arm. The resistance wheel of each resistance unit comprises a friction wheel fastened to an opposite end of the respective resistance wheel axle and stopped against the friction portion of the associating resistance shrapnel to enhance the resistance effect of the resistance unit.

Preferably, the casing comprises a first stop wall and a second stop wall. The one-way pawl is disposed between the first stop wall and the second stop wall, comprising an arcuate portion elastically stopped against the first stop wall, and thus the one-way pawl enables the one-way sprocket to rotate in one direction.

Further, it is another object of the present invention to provide a non pull cord window blind, which comprises a top rail, a bottom rail spaced below the top rail, a blind body coupled between the top rail and the bottom rail, and a blind body positioning mechanism as described above. The casing of the blind body positioning mechanism is mounted inside the top rail. Further, each transmission cord of the blind body positioning mechanism has an opposite end thereof inserted through the blind body and connected to the bottom rail so that the bottom rail can be synchronously moved with the two transmission cords.

Other advantages and features of the present invention will be fully understood by reference to the following specification in conjunction with the accompanying drawings, in which like reference signs denote like components of structure.

DETAILED DESCRIPTION OF THE INVENTION

Figure 1:
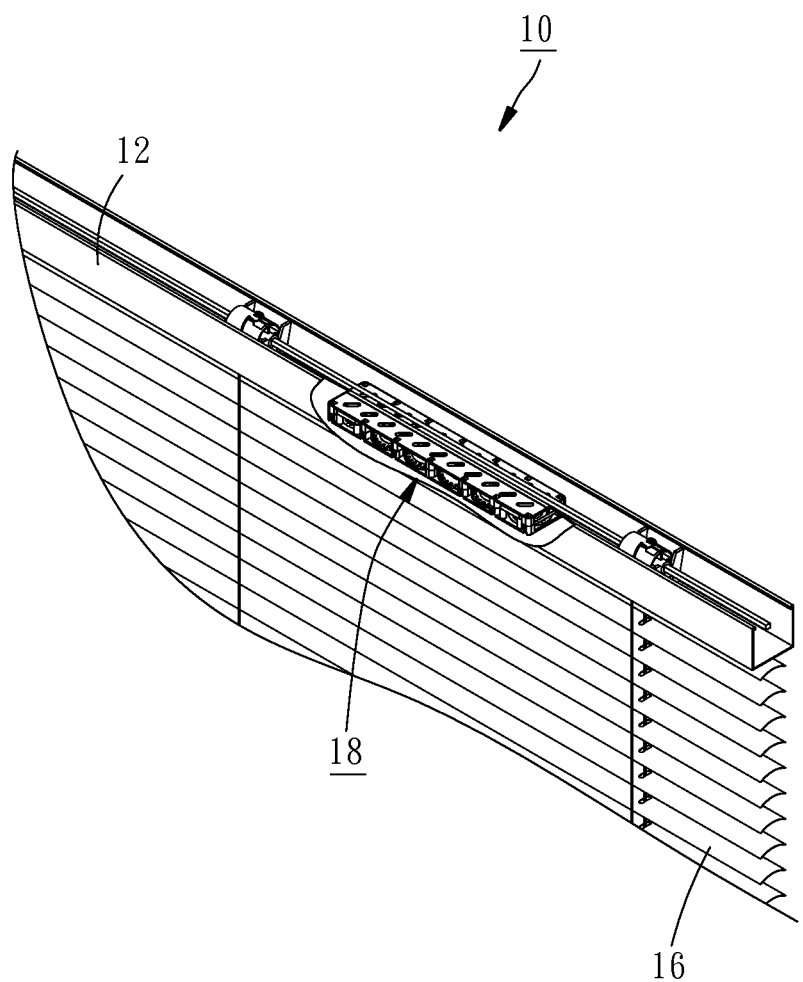
FIG. 1 is an oblique top elevational view illustrating a blind body positioning mechanism installed in a non pull cord window blind in accordance with a first embodiment of the present invention.
Figure 2:
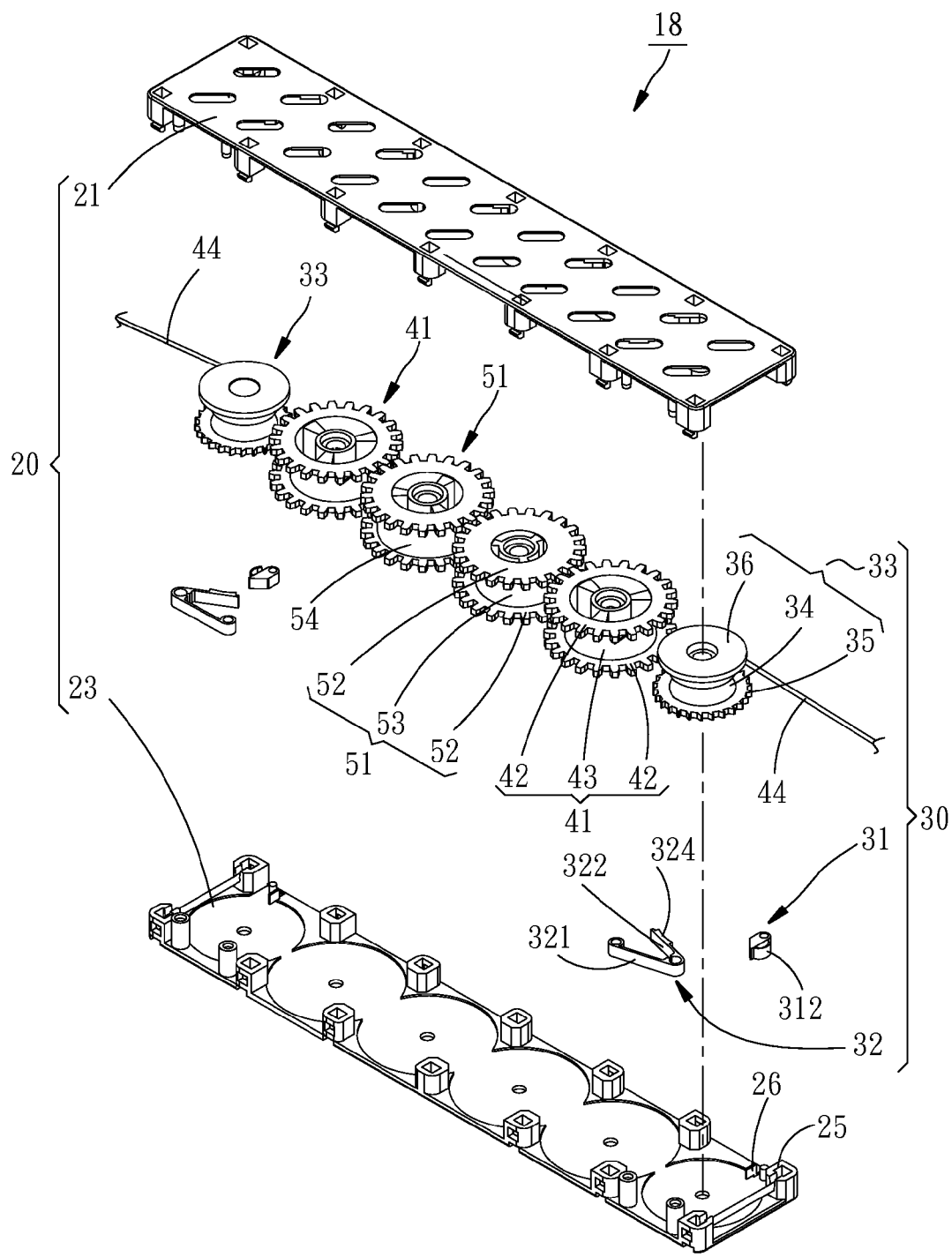
FIG. 2 is an exploded view of a part of the blind body positioning mechanism in accordance with the first embodiment of the present invention.
Figure 4:
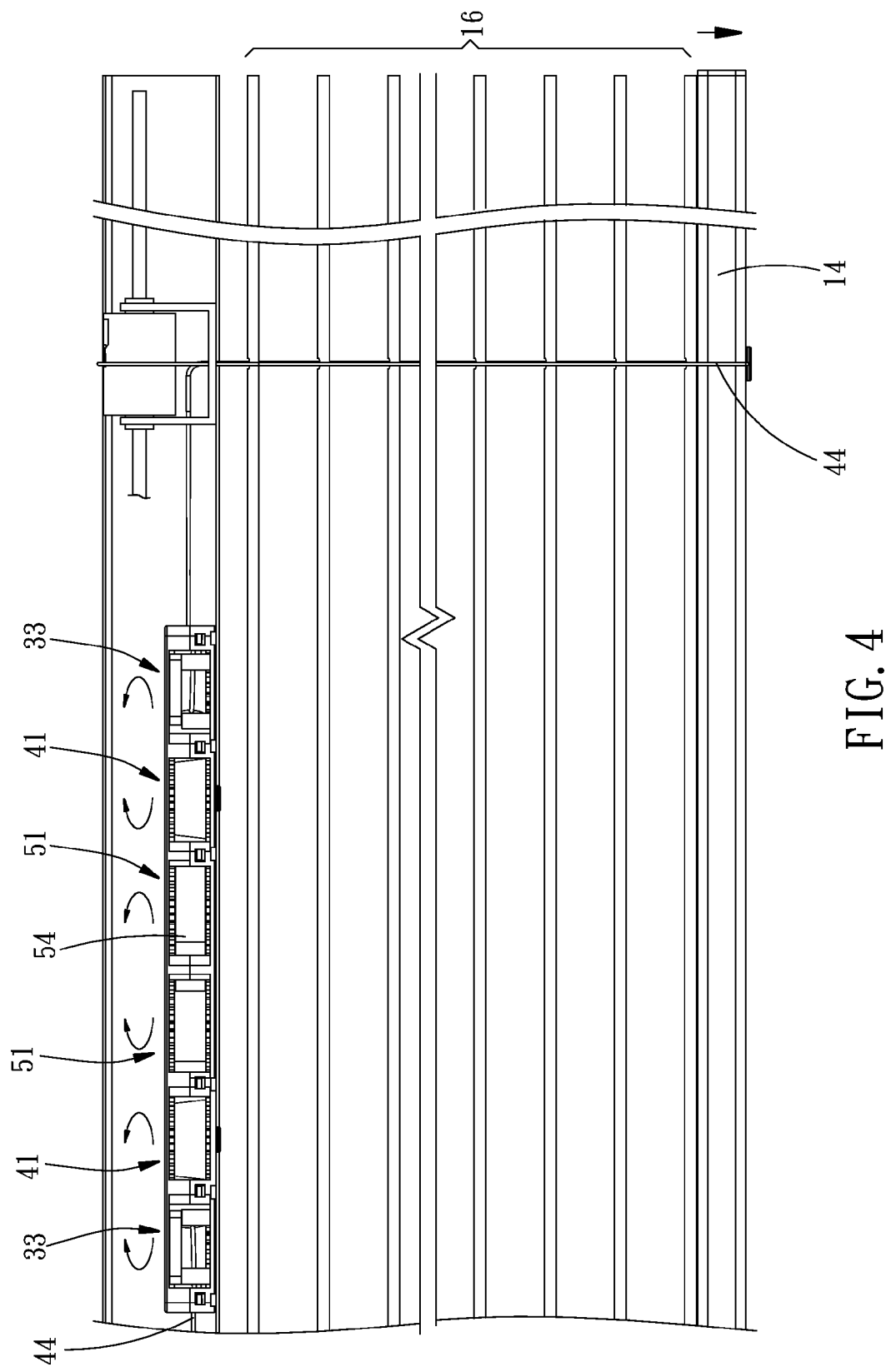
FIG. 4 is a schematic plain view of the first embodiment of the present invention, illustrating a status of the non pull cord window blind after the transmission cords of the blind body positioning mechanism are stretched.

Referring to FIGS. 1 and 4, a non pull cord window blind 10 in accordance with the present invention is shown. As illustrated, the non pull cord window blind 10 comprises a top rail 12, an opposing bottom rail 14, and blind body 16 coupled between the top rail 12 and the bottom rail 14. Referring to FIG. 2, a blind body positioning mechanism 18 in accordance with a first embodiment of the present invention comprises a casing 20, two resistance units 30, two first transmission wheels 41, two transmission cords 44, two second transmission wheels 51, and a coil spring 54.

The casing 20 is mounted inside the top rail 12, comprising a top locating plate 21 and a bottom locating plate 23. The top locating plate 21 and the bottom locating plate 23 are fastened to each other.

Each resistance unit 30 comprises a one-way pawl 31, a resistance shrapnel 32, and a resistance wheel 33. The one-way pawl 31 is disposed between a first stop wall 25 and a second stop wall 26 in the casing 20, having one end thereof pivotally fastened to the casing 20 between the top locating plate 21 and the bottom locating plate 23. Further, the one-way pawl 31 has an arcuate portion 312 defined on one side thereof and stopped against the first stop wall 25 of the casing 20 so that the one-way pawl 31 can be biased by an external force between the first stop wall 25 and the second stop wall 26. The resistance shrapnel 32 comprises a locating arm 321, an elastic arm 322, and a friction portion 324. The locating arm 321 has two opposite ends thereof fixedly fastened to the casing 20 between the top locating plate 21 and the bottom locating plate 23. The elastic arm 322 extends from one end of the locating arm 321. The friction portion 324 is located at a rear end of the elastic arm 322 remote from the locating arm 321. The resistance wheel 33 comprises a resistance wheel axle 34, a one-way sprocket 35, and a friction wheel 36. The resistance wheel axle 34 is rotatably mounted in the casing 20 between the top locating plate 21 and the bottom locating plate 23. The one-way sprocket 35 is fixedly fastened to a bottom end of the resistance wheel axle 34 and meshed with the one-way pawl 31 so that the one-way sprocket 35 can only be rotated in one direction. The friction wheel 36 is fixedly fastened to an opposing top end of the resistance wheel axle 34 and stopped against the friction portion 324 of the resistance shrapnel 32.

Each first transmission wheel 41 comprises two first transmission sprockets 42 (actually, one single transmission sprocket can achieve the same effect), and a first transmission wheel axle 43 connected between the two first transmission sprockets 42. During installation, the first transmission wheel axle 43 is coupled between the top locating plate 21 and bottom locating plate 23 of the casing 20. After installation, the two first transmission wheels 41 are spaced between the two resistance wheels 33.

Figure 3:
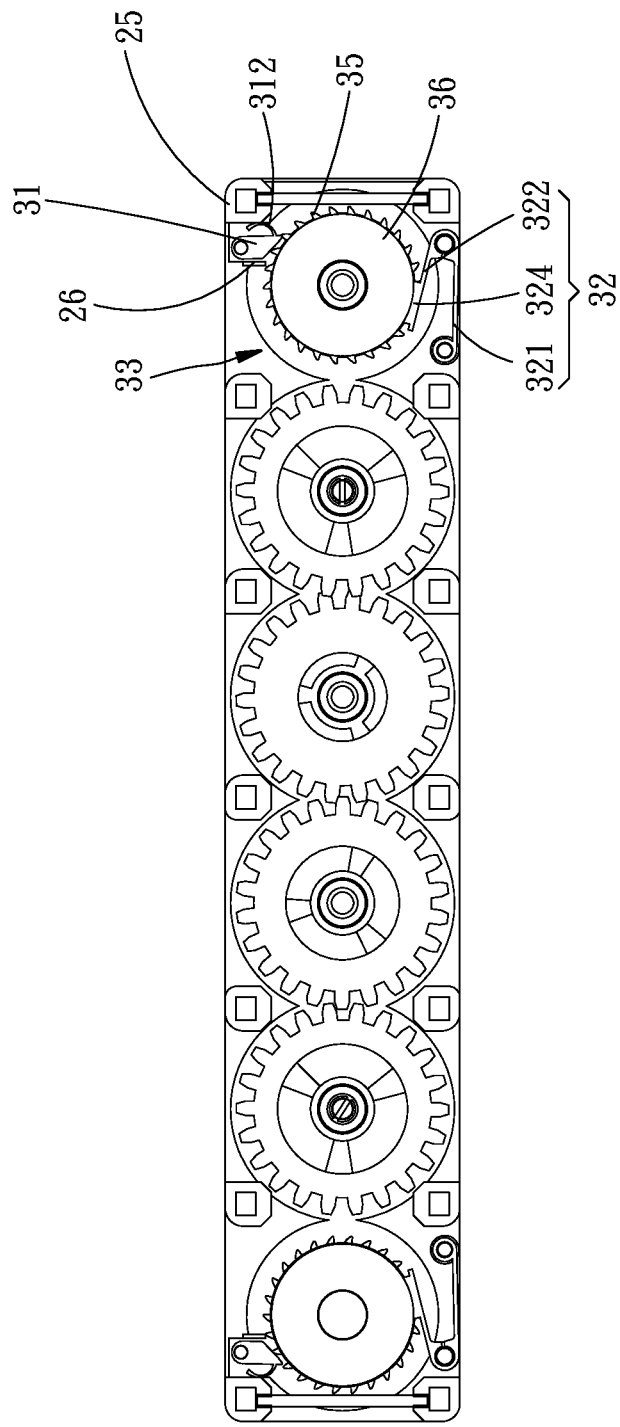
FIG. 3 is a bottom view of the blind body positioning mechanism in accordance with the first embodiment of the present invention.

As illustrated in FIG. 3 and FIG. 4, each transmission cord 44 is wound round the resistance wheel axle 34 of one respective resistance wheel 33 with one end thereof fixedly connected to the first transmission wheel axle 43 of the respective first transmission wheel 41 and an opposite end thereof inserted through the blind body 16 and fixedly fastened to the bottom rail 14.

Each second transmission wheel 51 comprises two second transmission sprockets 52 (actually, one single transmission sprocket can achieve the same effect), and a second transmission wheel axle 53 connected between the two second transmission sprockets 52. During installation, the second transmission wheel axle 53 is coupled between the top locating plate 21 and bottom locating plate 23 of the casing 20, enabling the second transmission sprockets 52 of the two second transmission wheels 51 to be meshed together and then respectively meshed with the first transmission sprockets 42 of the first transmission wheels 41. Thus, the first transmission wheels 41 and the second transmission wheels 51 can be rotated synchronously.

The coil spring 54 connects the second transmission wheel axles 53 of the two second transmission wheels 51, and is selectively wound round the second transmission wheel axle 53 of one second transmission wheel 51.

When wishing to extend out the blind body 16, as shown in FIG. 4, pull the bottom rail 14 downwards to stretch the transmission cords 44. Stretching the transmission cords 44 will drive the resistance wheels 33 and the first transmission wheels 41 to rotate and to further drive the second transmission wheels 51 to rotate. During rotation of the second transmission wheels 51, the coil spring 54 is rolled up from one second transmission wheel 51 to the other second transmission wheel 51 to accumulate elastic potential energy. On the other hand, the friction produced between the friction wheels 36 and the friction portions 324 of the resistance shrapnels 32 during rotation of the resistance wheels 33 effectively smoothens the movement of the blind body 16. When the pulling force is released from the bottom rail 14 after the blind body 16 is fully extended out, the engagement relationship between the one-way pawls 31 and the respective one-way sprockets 35 causes the resistance wheels 33 to be stopped from rotation, and thus, the friction resistance between the transmission cords 44 and the resistance wheels 33 is kept in balance with the elastic restoring force of the coil spring 54 at this time, holding the blind body 16 in the extended status.

Figure 5:
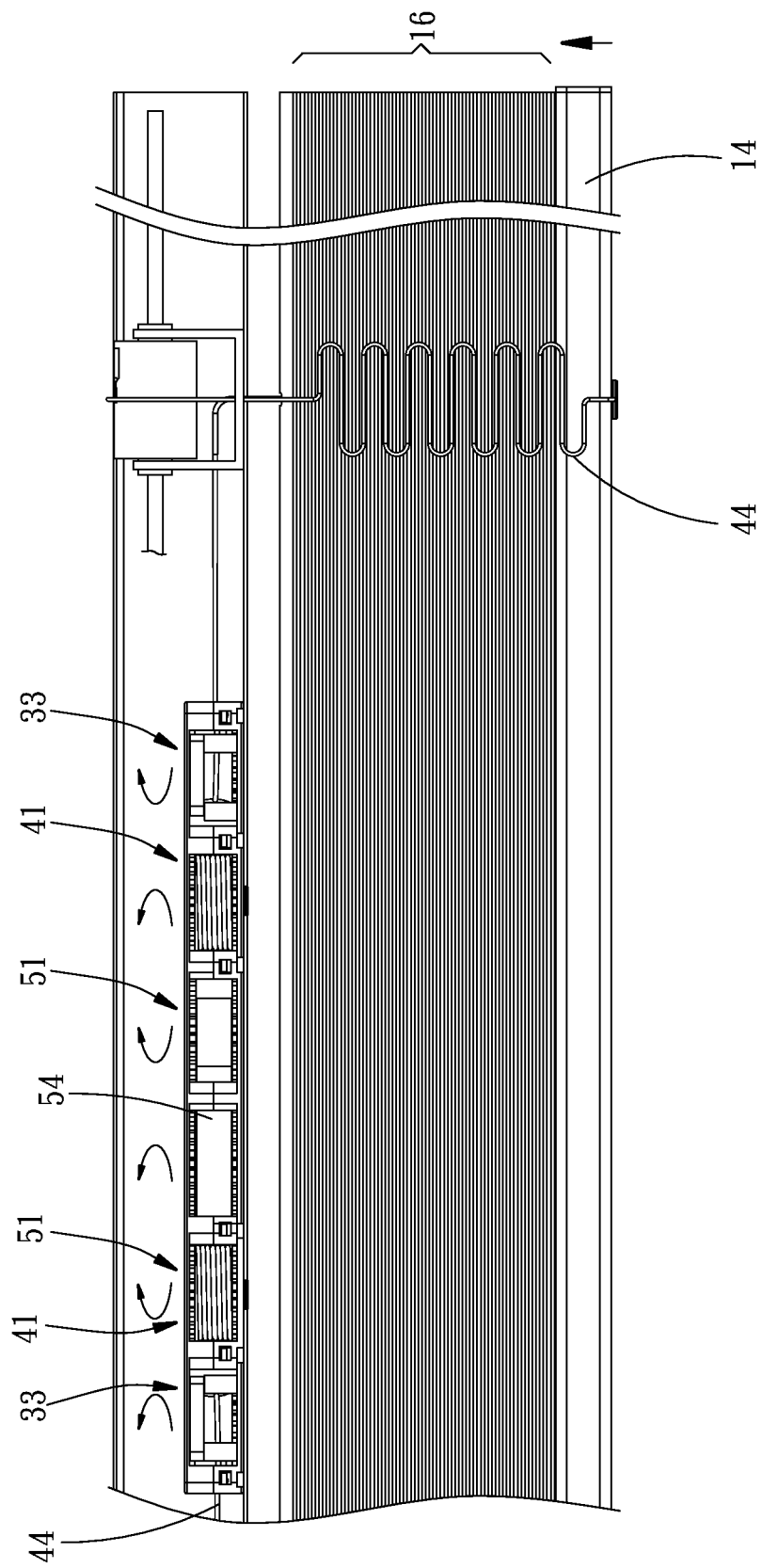
FIG. 5 is similar to FIG. 4, illustrating a status of the non pull cord window blind after the transmission cords of the blind body positioning mechanism are rolled up.

When wishing to receive the blind body 16, as shown in FIG. 5, push the bottom rail 14 upwards to loosen the transmission cords 44 and to further reduce the friction resistance between the transmission cords 44 and the resistance wheels 33. At this time, under the assistance of the push force from the user, the elastic restoring force of the coil spring 54 forces the two second transmission wheels 51 to rotate reversely. During rotation of the second transmission wheels 51, the first transmission wheels 41 are driven by the second transmission wheels 51 to rotate and to roll up the respective transmission cords 44. When the user releases the push force from the bottom rail 14 after the blind body 16 is fully received, the transmission cords 44 are tightly wound round the respective resistance wheels 33. At this time, the elastic restoring force of the coil spring 54 is kept in balance with the friction resistance between the transmission cords 44 and the resistance wheels 33, holding the blind body 16 in the received status.

Figure 6:
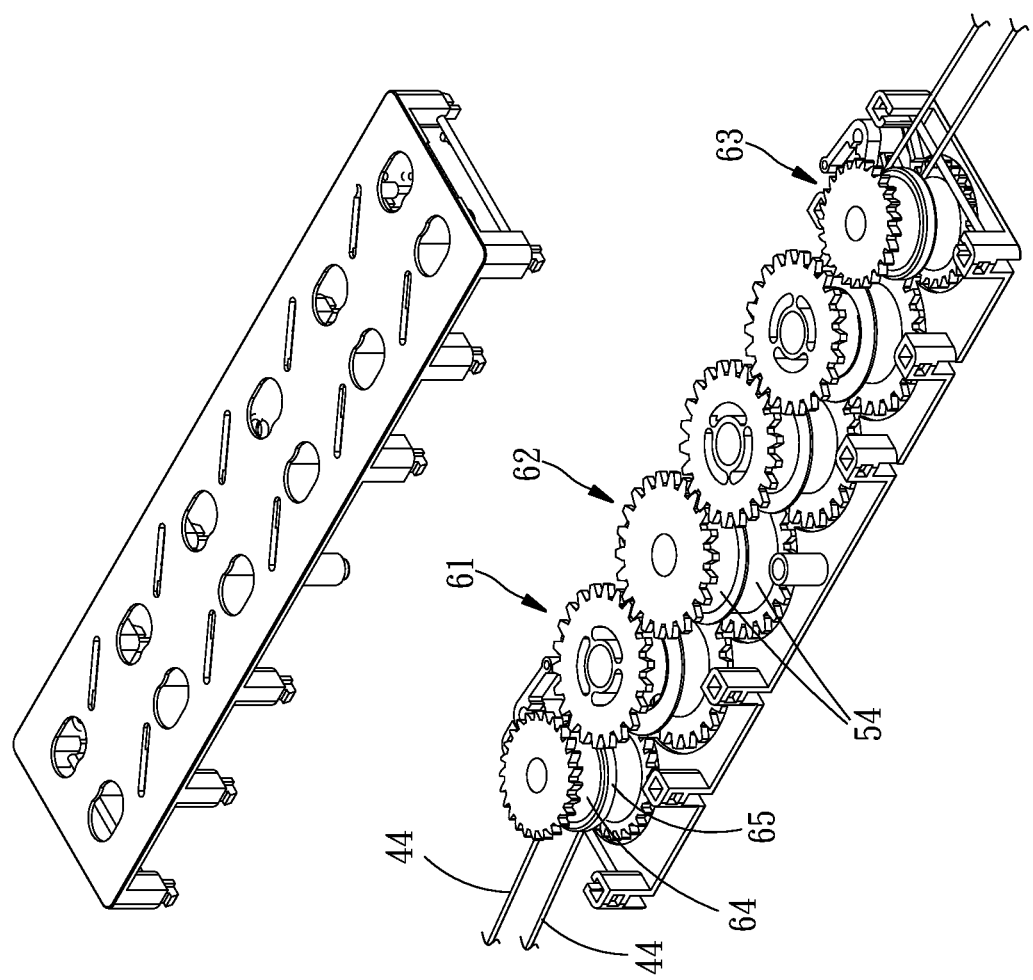
FIG. 6 is an exploded view of a part of a blind body positioning mechanism in accordance with a second embodiment of the present invention.

It is to be noted that the structure of the present invention can be variously embodied. In a second embodiment of the present invention, as illustrated in FIG. 6, the resistance wheel axle 64 of each resistance wheel 63 has two transmission cords 44 wound thereon. These two transmission cords 44 are separated by the friction wheel 65 of the respective resistance wheel 63. Further, these two transmission cords 44 each have one end thereof connected to one first transmission wheel 61. Further, the two second transmission wheels 62 are connected by two coil springs 54. Thus, this second embodiment is practical for use with a large blind body.

In conclusion, the blind body positioning mechanism 18 of the present invention utilizes the friction resistance between the transmission cords 44 and the resistance wheels 33 and the well-meshed relationship between the one-way pawls 31 and the resistance wheels 33 to provide excellent positioning effects, effectively eliminating the rebounding problem of the blind body after fully extended out and the problem of sagging after fully received, and achieving the purpose of improving the usability.

What is claimed is:

1. A blind body positioning mechanism used in a non pull cord window blind, comprising:

a casing;

two resistance units, each said resistance unit comprising a one-way pawl and a resistance wheel, said one-way pawl being pivotally connected to said casing, said resistance wheel comprising a resistance wheel axle rotatably mounted in said casing and at least one one-way sprocket fixedly connected to one end of said resistance wheel axle and engaged with said one-way pawl;

two first transmission wheels rotatably mounted in said casing and spaced from each other;

two transmission cords respectively wound round said resistance wheel axles of said resistance wheels and respectively connected with respective one ends thereof to said first transmission wheels;

two second transmission wheels rotatably mounted in said casing between said two first transmission wheels, said two second transmission wheels being meshed together and respectively meshed with said first transmission wheels; and a coil spring connecting said two second transmission wheels and selectively wound round one said second transmission wheel.

2. The blind body positioning mechanism as claimed in claim 1, wherein each said resistance unit further comprises a resistance shrapnel mounted in said casing, said resistance shrapnel comprising an elastic arm and a friction portion located at said elastic arm; said resistance wheel further comprises a friction wheel extending around the resistance wheel axle thereof and stopped against the friction portion of the resistance shrapnel of the respective said resistance unit.

3. The blind body positioning mechanism as claimed in claim 1, wherein said casing comprises a first stop wall and a second stop wall; said one-way pawl is disposed between said first stop wall and said second stop wall, comprising an arcuate portion stopped against said first stop wall.

4. The blind body positioning mechanism as claimed in claim 1, wherein each said first transmission wheel comprises a first transmission sprocket and a first transmission wheel axle connected with said first transmission sprocket; each said transmission cord has one end thereof fixedly connected to the first transmission wheel axle of one said first transmission wheel; each said second transmission wheel comprises a second transmission sprocket and a second transmission wheel axle connected with said second transmission sprocket, said second transmission sprocket being meshed with the first transmission sprocket of one respective said first transmission wheel; said coil spring connects the second transmission wheel axles of said second transmission wheels and selectively wound round the second transmission wheel axle of one said second transmission wheel.

5. A non pull cord window blind, comprising:
a top rail;
a bottom rail spaced below said top rail;
a blind body coupled between said top rail and said bottom rail; and a blind body positioning mechanism as claimed in claim 1, the casing of said blind body positioning mechanism being mounted inside said top rail, each transmission cord of said blind body positioning mechanism having an opposite end thereof inserted through said blind body and connected to said bottom rail.

6. The non pull cord window blind as claimed in claim 5, wherein each said resistance unit of said blind body positioning mechanism further comprises a resistance shrapnel mounted in said casing, said resistance shrapnel comprising an elastic arm and a friction portion located at said elastic arm; said resistance wheel of each said resistance unit of said blind body positioning mechanism further comprises a friction wheel extending around the resistance wheel axle thereof and stopped against the friction portion of the resistance shrapnel of the respective said resistance unit.

7. The non pull cord window blind as claimed in claim 5, wherein said casing of said blind body positioning mechanism comprises a first stop wall and a second stop wall; said one-way pawl of each said resistance unit of said blind body positioning mechanism is disposed between said first stop wall and said second stop wall of said casing, comprising an arcuate portion stopped against said first stop wall.

8. The non pull cord window blind as claimed in claim 5, wherein each said first transmission wheel of said blind body positioning mechanism comprises a first transmission sprocket and a first transmission wheel axle connected with said first transmission sprocket; each said transmission cord of said blind body positioning mechanism has one end thereof fixedly connected to the first transmission wheel axle of one said first transmission wheel; each said second transmission wheel of said blind body positioning mechanism comprises a second transmission sprocket and a second transmission wheel axle connected with said second transmission sprocket, said second transmission sprocket being meshed with the first transmission sprocket of one respective said first transmission wheel; said coil spring of said blind body positioning mechanism connects the second transmission wheel axles of said second transmission wheels and selectively wound round the second transmission wheel axle of one said second transmission wheel.

\* \* \* \* \*